(12) United States Patent
Mallesan

(10) Patent No.: US 7,861,003 B2
(45) Date of Patent: *Dec. 28, 2010

(54) ADAPTIVE FEEDBACK FOR SESSION OVER INTERNET PROTOCOL

(75) Inventor: Saravanan Mallesan, Fairfax, VA (US)

(73) Assignee: Genband US LLC, Plano, TX (US)

( * ) Notice: Subject to any disclaimer, the term of this patent is extended or adjusted under 35 U.S.C. 154(b) by 858 days.

This patent is subject to a terminal disclaimer.

(21) Appl. No.: 11/343,212

(22) Filed: Jan. 31, 2006

(65) Prior Publication Data

US 2007/0180141 A1    Aug. 2, 2007

(51) Int. Cl.
G06F 15/173    (2006.01)

(52) U.S. Cl. .................... 709/239; 709/238

(58) Field of Classification Search ........... 709/230, 709/239, 238
See application file for complete search history.

(56) References Cited

U.S. PATENT DOCUMENTS

| | | | |
|---|---|---|---|
| 5,796,424 A * | 8/1998 | Ely et al. ............ 348/14.1 |
| 6,738,813 B1 * | 5/2004 | Reichman ............ 709/224 |
| 6,775,269 B1 | 8/2004 | Kaczmarczyk et al. |
| 6,775,280 B1 | 8/2004 | Ma et al. |
| 6,895,429 B2 | 5/2005 | Banga et al. |
| 6,904,017 B1 | 6/2005 | Meempat et al. |
| 6,944,678 B2 | 9/2005 | Lu et al. |
| 6,980,526 B2 | 12/2005 | Jang et al. |
| 7,002,973 B2 | 2/2006 | MeLampy et al. |
| 7,028,092 B2 | 4/2006 | MeLampy et al. |
| 7,031,311 B2 | 4/2006 | MeLampy et al. |
| 7,058,974 B1 | 6/2006 | Maher, III et al. |
| 7,072,303 B2 | 7/2006 | MeLampy et al. |
| 7,133,923 B2 | 11/2006 | MeLampy et al. |
| 7,142,532 B2 | 11/2006 | Penfield et al. |
| 7,151,781 B2 | 12/2006 | MeLampy et al. |
| 7,193,996 B2 | 3/2007 | Dobbins et al. |
| 7,260,085 B2 | 8/2007 | Dobbins et al. |
| 7,362,707 B2 | 4/2008 | MeLampy et al. |

(Continued)

FOREIGN PATENT DOCUMENTS

EP    1 043 648 A2    10/2000

(Continued)

OTHER PUBLICATIONS

Aleksandra Smiljanić, Flexible Bandwidth Allocation in High-Capacity Packet Switches., IEEE/ACM Transactions on Networking (TON), vol. 10, Issue 2., IEEE Press., Piscataway, NJ, USA., Apr. 2002.*

(Continued)

*Primary Examiner*—Wing F Chan
*Assistant Examiner*—Kostas Katsikis
(74) *Attorney, Agent, or Firm*—Jenkins, Wilson, Taylor & Hunt, P.A.

(57) ABSTRACT

A method includes receiving an instruction associated with a definition of an alarm condition and modifying a session controller associated with a Session over Internet Protocol (SoIP) network based on the alarm condition. The session controller can be modified when the alarm condition, which is defined based on session data, is changed from satisfied to unsatisfied or unsatisfied to satisfied. The modifying of the session controller is associated with a set of connections that includes more than zero connections.

20 Claims, 5 Drawing Sheets

U.S. PATENT DOCUMENTS

| | | | |
|---|---|---|---|
| 7,376,731 B2 | 5/2008 | Khan et al. | |
| 7,433,315 B2* | 10/2008 | Bhatia et al. | 370/237 |
| 7,447,160 B1* | 11/2008 | Croak et al. | 370/242 |
| 7,466,710 B1 | 12/2008 | Clemm et al. | |
| 7,483,380 B2* | 1/2009 | Metke | 370/238 |
| 2001/0033551 A1 | 10/2001 | Busuioc et al. | |
| 2002/0024954 A1 | 2/2002 | Cunetto et al. | |
| 2002/0087689 A1 | 7/2002 | Chen | |
| 2002/0087721 A1 | 7/2002 | Sato et al. | |
| 2003/0005152 A1* | 1/2003 | Diwan et al. | 709/239 |
| 2003/0072271 A1 | 4/2003 | Simmons et al. | |
| 2003/0161310 A1 | 8/2003 | Dobbins et al. | |
| 2003/0186702 A1 | 10/2003 | McConnell et al. | |
| 2003/0225893 A1* | 12/2003 | Roese et al. | 709/227 |
| 2004/0015583 A1* | 1/2004 | Barrett et al. | 709/224 |
| 2004/0025186 A1* | 2/2004 | Jennings et al. | 725/93 |
| 2004/0044871 A1 | 3/2004 | Weber et al. | |
| 2004/0066782 A1 | 4/2004 | Nassar | |
| 2004/0086093 A1 | 5/2004 | Schranz | |
| 2004/0109541 A1 | 6/2004 | Celi et al. | |
| 2004/0117624 A1* | 6/2004 | Brandt et al. | 713/166 |
| 2004/0128201 A1* | 7/2004 | Ofir et al. | 705/17 |
| 2004/0213210 A1 | 10/2004 | Dube et al. | |
| 2004/0218614 A1 | 11/2004 | Yokomitsu et al. | |
| 2004/0250114 A1* | 12/2004 | Parekh et al. | 713/201 |
| 2005/0111382 A1 | 5/2005 | Le et al. | |
| 2005/0111455 A1 | 5/2005 | Nozue et al. | |
| 2005/0147031 A1 | 7/2005 | Bhatia et al. | |
| 2005/0213591 A1 | 9/2005 | Nakazawa et al. | |
| 2005/0265231 A1* | 12/2005 | Gunther et al. | 370/225 |
| 2006/0088025 A1 | 4/2006 | Barkley et al. | |
| 2006/0098577 A1 | 5/2006 | MeLampy et al. | |
| 2006/0126664 A1* | 6/2006 | Horton | 370/471 |
| 2006/0147013 A1 | 7/2006 | Baumeister et al. | |
| 2006/0187927 A1 | 8/2006 | MeLampy et al. | |
| 2006/0187942 A1 | 8/2006 | Mizutani et al. | |
| 2006/0215683 A1 | 9/2006 | Sukkar et al. | |
| 2006/0245574 A1 | 11/2006 | Phelps et al. | |
| 2007/0019619 A1 | 1/2007 | Foster et al. | |
| 2007/0036151 A1 | 2/2007 | Baeder | |
| 2007/0058639 A1 | 3/2007 | Khan | |
| 2007/0076591 A1 | 4/2007 | Khan | |
| 2007/0076594 A1 | 4/2007 | Khan et al. | |
| 2007/0076603 A1 | 4/2007 | MeLampy et al. | |
| 2007/0076710 A1 | 4/2007 | Khan | |
| 2007/1007685 | 4/2007 | MeLampy et al. | |
| 2007/0104105 A1 | 5/2007 | MeLampy et al. | |
| 2007/0116043 A1 | 5/2007 | MeLampy et al. | |
| 2007/0180124 A1 | 8/2007 | Mallesan et al. | |
| 2007/0180142 A1 | 8/2007 | Small et al. | |
| 2007/0201472 A1 | 8/2007 | Bhatia et al. | |
| 2007/0201473 A1 | 8/2007 | Bhatia et al. | |
| 2007/0201481 A1 | 8/2007 | Bhatia et al. | |
| 2007/0201494 A1 | 8/2007 | Lou et al. | |
| 2007/1018008 | 8/2007 | Mallesan et al. | |
| 2007/0263660 A1 | 11/2007 | Mitsumori | |
| 2008/0101343 A1 | 5/2008 | Monette et al. | |
| 2008/0159294 A1 | 7/2008 | Irish et al. | |
| 2008/0285569 A1 | 11/2008 | Stademann et al. | |
| 2009/0046720 A1 | 2/2009 | Streijl et al. | |
| 2009/0086728 A1 | 4/2009 | Gulati et al. | |

FOREIGN PATENT DOCUMENTS

| | | |
|---|---|---|
| JP | 2004193845 A * | 7/2004 |
| WO | WO 02/49279 A2 | 6/2002 |
| WO | WO 02/49315 A2 | 6/2002 |
| WO | WO 02/49316 A2 | 6/2002 |
| WO | WO 02/058349 | 7/2002 |
| WO | WO 02/060116 A2 | 8/2002 |

OTHER PUBLICATIONS

Yenra: VOIP: Session Border Controller [online], dated Oct. 18, 2004, [retrieved on Dec. 20, 2004]. Retrieved from the Internet: <URL: http://www.yenra.com/session-border-controller/> (2 pages).

Stephen Hayes, "IP Based Multimedia Services Platform," Ericsson, ITU-T IMT-2000 and Beyond—May 28, 2002, Ottawa, CN (19 pages).

Acme Packet, Inc., "Session Admission Control: Interactive Communication SLAs over Skinny Pipes" (2002) (14 pages).

Official Action for U.S. Appl. No. 11/343,218 (Mar. 18, 2009).

Official Action for U.S. Appl. No. 11/343,211 (Mar. 4, 2009).

Liu et al., "WSIP—Web Service SIP Endpoint for Converged Multimedia/Multimodal Communication over IP," IEEE International Conference on Web Services (ICWS'04), pp. 1-8 (Jul. 6-9, 2004).

Interview Summary for U.S. Appl. No. 11/537,329 (Mar. 1, 2010).

Interview Summary for U.S. Appl. No. 11/537,345 (Feb. 5, 2010).

Final Official Action for U.S. Appl. No. 11/343,211 (Dec. 18, 2009).

Final Official Action for U.S. Appl. No. 11/864,206 (Dec. 11, 2009).

Final Official Action for U.S. Appl. No. 11/343,218 (Nov. 13, 2009).

Official Action for U.S. Appl. No. 11/537,345 (Nov. 3, 2009).

Official Action for U.S. Appl. No. 11/537,316 (Sep. 25, 2009).

Official Action for U.S. Appl. No. 11/537,329 (Sep. 18, 2009).

Non-Final Official Action for U.S. Appl. No. 11/864,206 (Jul. 23, 2009).

Interview Summary for U.S. Appl. No. 11/343,218 (Jul. 22, 2009).

Notification of Transmittal of the International Search Report and the Written Opinion of the International Searching Authority, or the Declaration for International Application No. PCT/US2008/077987 (Jul. 14, 2009).

Official Action for U.S. Appl. No. 11/537,329 (Feb. 20, 2009).

Official Action for U.S. Appl. No. 11/537,316 (Feb. 20, 2009).

Tyson et al., "How VoIP Works," Dockitmoto, http://computer.howstuffworks.com/ip-telephony.htm/printable (Downloaded from the Internet on Jan. 19, 2006).

"NexTone Products," http://www.nextone.com/pages/products/product.htm, (Copyright 2005) (Downloaded from the Internet on Jan. 19, 2006).

Interview Summary for U.S. Appl. No. 11/864,206 (Jul. 6, 2010).

Final Official Action for U.S. Appl. No. 11/864,206 (May 28, 2010).

Notice of Allowance for U.S. Appl. No. 11/864,206 (Nov. 12, 2010).

Notice of Allowance and Fee(s) Due for U.S. Appl. No. 11/343,218 (Sep. 8, 2010).

Notice of Allowance and Fee(s) Due for U.S. Appl. No. 11/343,211 (Sep. 7, 2010).

* cited by examiner

ADAPTIVE FEEDBACK FOR SESSION OVER INTERNET PROTOCOL

RELATED APPLICATIONS

This application is related to the following commonly owned and assigned applications: application Ser. No. 11/343,211, "Method and Apparatus for Partitioning Resources within a Session-Over-Internet-Protocol (SoIP) Session Controller," filed herewith; and application Ser. No. 11/343,218, "Session Data Records (SDRs) and Related Alarming within a Session Over Internet Protocol (SoIP) Network," filed herewith; each of which is incorporated herein by reference in its entirety.

FIELD OF INVENTION

The present invention relates to Session over Internet Protocol (SoIP) networks, and in particular, but not by way of limitation, the present invention relates to systems and methods for modifying a route within a SoIP network.

BACKGROUND

Voice telecommunications has traditionally been conducted via dedicated telephone networks utilizing telephone switching offices and either wired or wireless connections for transmitting the voice signal between users' telephones. Such telecommunications, which used the public switched telephone network (PSTN), may be referred to as circuit committed communications. Because of the circuit based nature of the PSTN, modifying a connection by setting up a circuit and implementing a routing change can be a relatively slow process that often requires manual intervention. If considered in the context of the open system interconnection (OSI) model, PSTN modifications generally occur on layers one, two, and three.

Session over Internet Protocol (SoIP), also referred to as Media over Internet Protocol (MoIP), provides an alternative communication means that uses discrete Internet Protocol (IP) packets of digitized information to transmit media content such as voice content, video content and/or data, over the internet or within an intranet via wired and/or wireless connections. SoIP technology includes Voice over Internet Protocol (VoIP) technology, which is used primarily to transmit voice signals over an IP network. Because SoIP technology is based on IP packet switching, SoIP connections and routes can be created and managed quickly using session aware components. Current session aware components, however, do not provide the routing appropriate for SoIP technology. For example, current session aware components do not use adaptive feedback to dynamically route based on full-cycle alarms, priorities associated with routes or endpoints, or connection-limits associated with routes or endpoints. Thus, a need exists for a method and apparatus for modifying SoIP network routes based on various types of feedback.

SUMMARY OF THE INVENTION

A method includes receiving an instruction associated with a definition of an alarm condition and modifying a session controller associated with a Session over Internet Protocol (SoIP) network based on the alarm condition. The session controller can be modified when the alarm condition, which is defined based on session data, is changed from satisfied to unsatisfied or unsatisfied to satisfied. The modifying of the session controller is associated with a set of connections that includes more than zero connections.

DETAILED DESCRIPTION

SoIP technology, also referred to as Media over Internet Protocol (MoIP), can be used to transmit many forms of communication such as voice (via Voice over Internet Protocol (VoIP)), video, video conferencing, digital data transfer, etc. A Session over Internet Protocol (SoIP) network can be dynamically modified based on a rule (e.g., a business policy) associated with the SoIP network. The rule can promote, for example, a modification of the SoIP network to meet the needs of, for example, customers using SoIP routes and/or service providers who manage the SoIP network. The rule can be enforced by monitoring session data with reference to an alarm condition and dynamically modifying the SoIP network based on the session data. This process of monitoring session data and dynamically modifying the SoIP network based on the session data can be referred to, for example, as adaptive feedback. A SoIP network modification can include, for example, the modification of a system resource, a route, a property associated with an endpoint, and/or a priority associated with a route.

The SoIP network modifications can be implemented using a session controller (SC) that stores session data in session-data-records (SDRs) associated with connections established within a SoIP network and provided to an SC-network controller. An SC can be part of a route between a source endpoint and a destination endpoint within a SoIP network, and can collect the session data about the respective SoIP connection. This session data can be stored within an SDR that is provided to the SC-network controller. The SDR can include values for one or more session layer parameters and/or extrinsic parameters. Upon receiving the SDR and other SDRs, the SC-network controller can trigger a feedback signal to the SC in response to an alarm condition that changes from satisfied to unsatisfied or vice versa. The alarm conditions can be based on any combination of the extrinsic parameters and session layer parameters using boolean logic or mathematics that will promote enforcement of the rule. Multiple alarm conditions can be tested simultaneously using alarm threads executing in parallel in an alarm pool.

The detailed description focuses on modifications involving a route within the SoIP network for illustrative purposes. In practice, the alarm flow can trigger any modification of the SoIP network that will promote the enforcement of a rule (e.g., business policy). For example, the SoIP modification can be the modification of a system resource such as a media routing or transcoding resource within an SC or a property associated with an endpoint.

Figure 1:
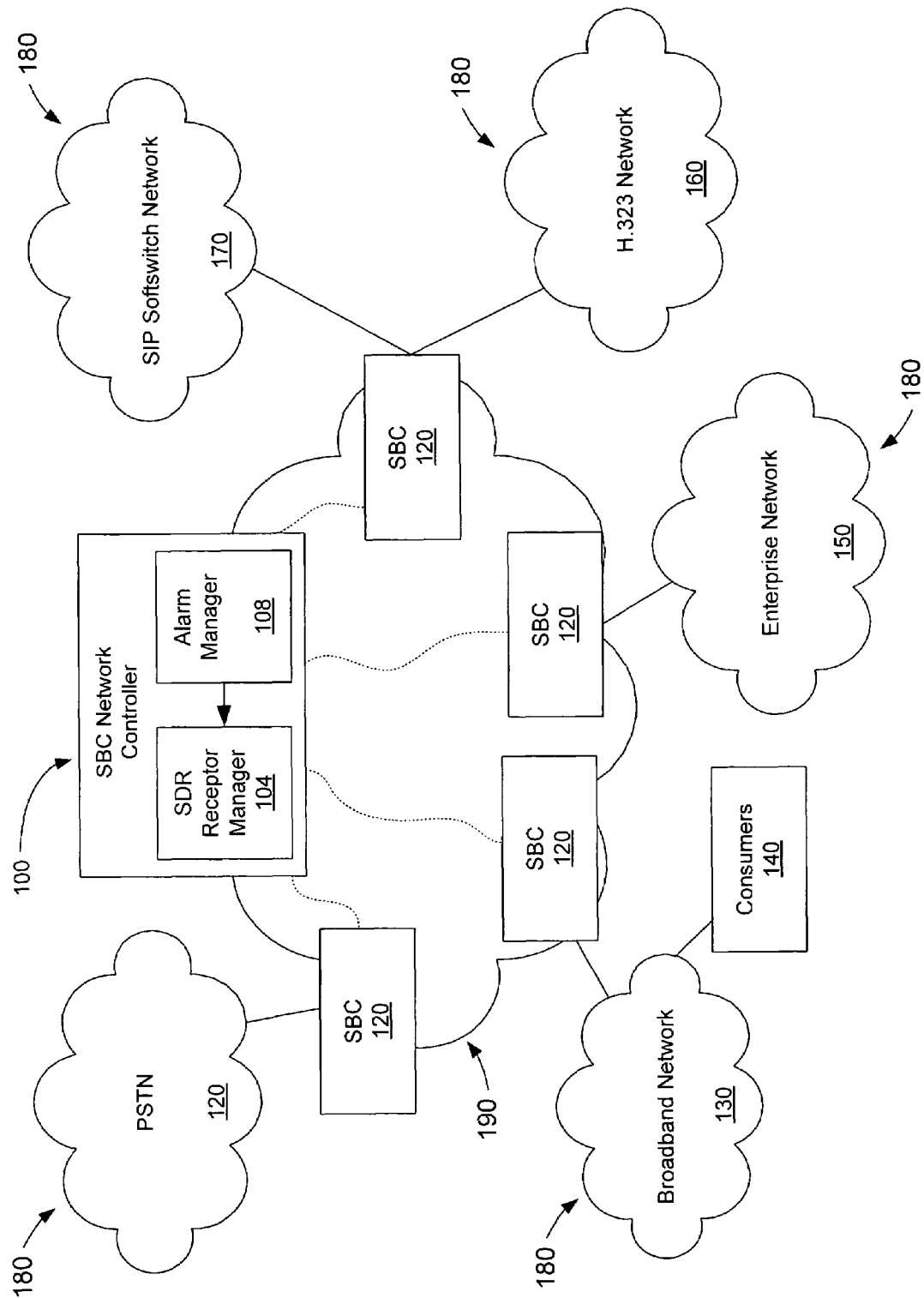
FIG. 1 shows a system block diagram of a Session over Internet Protocol (SoIP) network, according to an embodiment of the invention.

Referring now to the drawings, FIG. 1 is a block diagram of a SoIP network 190, according to an embodiment of the invention. The figure shows a session-border-controller network controller (SBC-network controller) 100 connected to multiple session border controllers (SBCs) 120. The SBCs 120 each establish, control, and monitor connections between one or more endpoints 180. The SBC-network controller 100 is a centralized management component that controls, configures, and coordinates the SoIP network 190. The SBC-network controller 100 can include a user interface (not shown) for configuring one or more SBCs 120 that are connected to the SBC-network controller 100. Because not all SCs in SoIP network 190 may be at the borders of the network, SBC-network controller 100 may, in such contexts, be termed an SC-network controller.

The SBCs 120 establish and control connections between the endpoints 180 based on routing information that includes, for example, routing logic, endpoint information, connection-limits, and route priority information. A route can be modified by, but is not limited to, changes in the routing information. The routing information can be individually associated with a given virtual routing partitions established on the SBC 120 or can be a commonly owned set of routing information that is managed on more than one SBC 120. More details regarding virtual partitions within an SBC are set forth in co-pending application Ser. No. 11/343,211, "Method and Apparatus for Partitioning Resources within a Session-Over-Internet-Protocol (SoIP) Session Controller," which is incorporated herein by reference.

Upon termination of a connection between endpoints 180, the SBCs 120 generate an SDR, also referred to as a session-detail-record, which contains session data about the connection. The session data can be stored in a record other than an SDR and includes, but is not limited to, session layer parameters and extrinsic parameters. The session layer parameters include, for example, a call duration indicator, start and end time indicators, and source and destination endpoint indicators as well as quality-of-service (QoS) information such as a delay indicator, a media quality indicator, a packet loss indicator, a packet delay variance (jitter) indicator, and a ratings factor (r-factor). An r-factor is a value derived from metrics, such as latency, jitter, and packet loss, for assessing the quality of VoIP calls. Extrinsic parameters include, for example, variables such as a time-of-day indicator, a day-of-the-week indicator, a number-of-calls indicator, or route cost parameters.

The SBC-network controller 100, which includes an SDR-receptor manager 104 and an alarm manager 108, processes session data with reference to an alarm condition based on a rule to determine whether a route should be modified when the alarm condition is either satisfied or unsatisfied. The alarm condition is based on, but is not limited to, the session data in the multiple SDRs, each of which includes the session layer parameters and the extrinsic parameters. The SDR-receptor manager 104 receives and stores the session data contained in the SDRs transmitted from the SBCs 120. The alarm manager 108 executes alarm threads that process session data relevant to alarm conditions.

The alarm manager 108 also determines, based on the processed session data and with reference to the alarm conditions, whether or not to generate a feedback signal that will result in the modification of a route. When the alarm condition changes from either satisfied to unsatisfied or vice versa, the alarm manager 108 sends one or more indicators that trigger the modification of one or more routes established, controlled, or monitored by the SBCs 120. The indicator can be a signal that triggers a routing change or a signal that contains a set of instructions with detailed information for modifying the routing information on at least one SBC 120. The indicator can also directly modify routing information, for example, by rewriting a file (e.g. a text file) stored on an SBC 120 and/or the SBC-network controller 100. In general, the functionality of the components within the SBC-network controller 100 can be implemented in software, firmware, custom hardware, or any combination thereof.

In this illustrative embodiment, the endpoints 180 include but are not limited to a public switched telephone network (PSTN) 120, broadband network 130 that can provide network access to consumers 140, enterprise network 150, H.323 network 160, session initiation protocol (SIP) softswitch network 170, or a SIP network (not shown). An endpoint 180 could also be an individual phone/computer terminal (not shown) or an access point to another SoIP network (not shown). Each of the endpoints 180 is an endpoint from the perspective of the individual SBC 120 that is connected to the endpoint 180.

The SDRs are typically received by the SBC-network controller 100 when the connection is terminated. In some embodiments, however, they can also be received by the SBC-network controller 100 in a batch mode at specified time intervals or upon request by the SBC-network controller 100. In some embodiments, SDRs or portions of SDRs can be received by the SBC-network controller before a connection has terminated as the portions become available.

Although the SBC-network controller 100 is centralized in the illustrative embodiment of FIG. 1, its functionality can, in other embodiments, be distributed throughout SoIP network 190 on any number of SCs that are on the borders or reside in the interior of the SoIP network 190. Also, the SBCs 120 can be configured to operate with a range of autonomy from an entirely autonomous mode independent from the SBC-network controller 100 to an entirely dependent mode where the SBCs 120 are controlled by the SBC-network controller 100.

Figure 2:
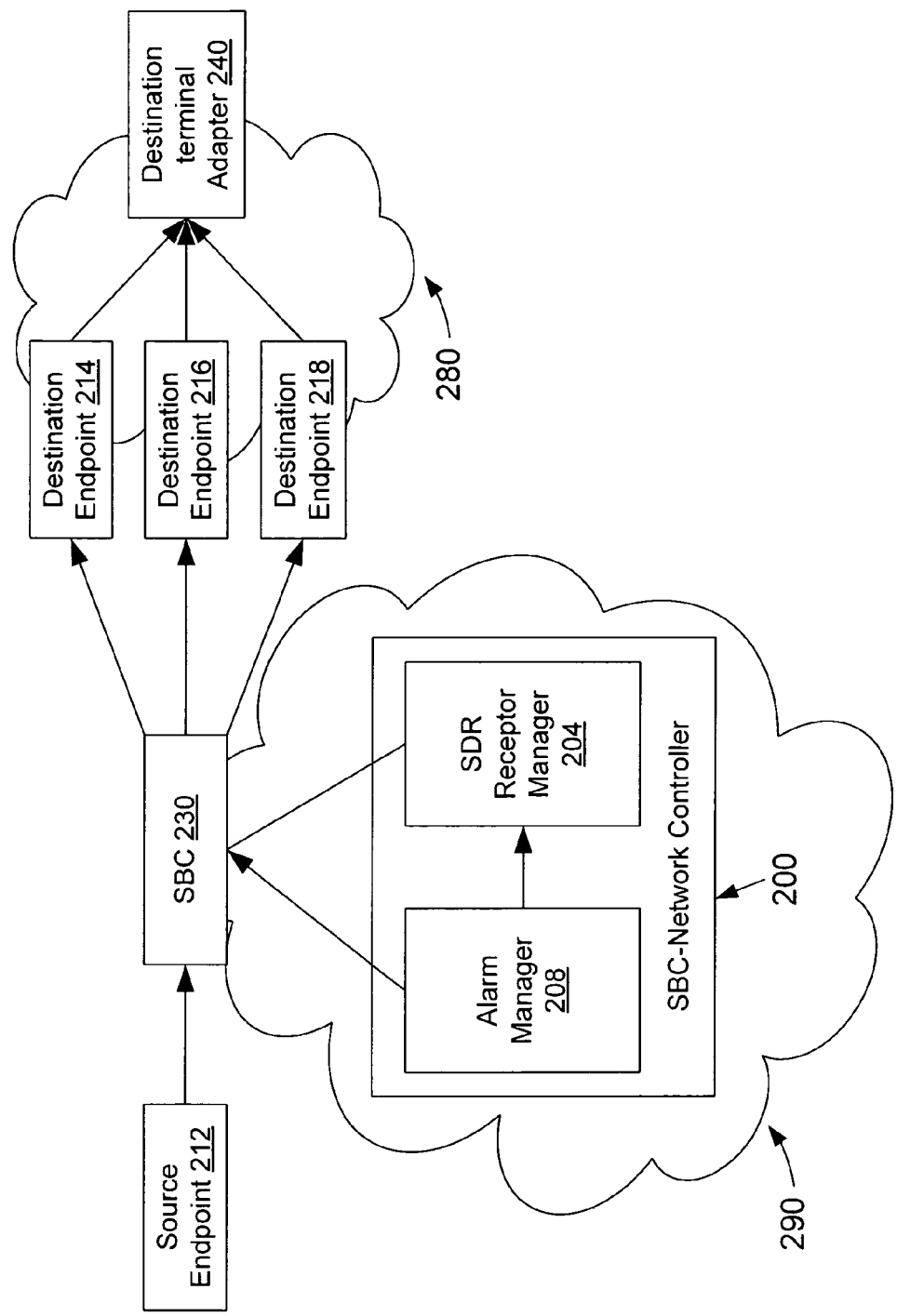
FIG. 2 shows a block diagram of a source endpoint connected to several destination endpoints via a session border controller, according to an embodiment of the invention.

FIG. 2 shows a block diagram of a source endpoint 212 connected to several destination endpoints 214, 216, and 218 via an SBC 230 in a SoIP network 290, according to an embodiment of the invention. The source endpoint 212 and destination endpoints 214, 216, and 218 are endpoints from the perspective of the SBC 230. The source endpoint 212 in this figure is requesting a connection with a destination terminal adapter 240 via a provider network 280. The destination endpoints 214, 216, and 218 are access points into the provider network 280. The source endpoint 212 can be routed through any one of the destination endpoints 214, 216, and 218 by the SBC 230 to connect with destination terminal adapter 240. In this embodiment each destination endpoint 214, 216, and 218 can be operated by a different entity and can provide a different level or quality-of-service.

The SBC 230 establishes the connection via one of the destination endpoints 214, 216, and 218 based on a feedback signal from the alarm manager 208 in the SBC-network controller 200. For example, the SBC 230 may typically establish connections from source endpoint 212 to the destination terminal adapter 240 via destination endpoint 214. Connection can typically be established through destination endpoint 214, because based on SDR session data and with reference to an alarm condition, destination endpoint 214 may be the preferred access point. As connections are terminated and additional SDR session data is collected and processed, the SBC-network controller 200 may determine based on an alarm condition that destination endpoint 216 should be used as the preferred endpoint rather than destination endpoint 214. This change in destination endpoint preferences can be implemented by modifying the routing information on SBC 230 according to a feedback signal (not shown) from SBC-network controller 200 to SBC 230.

A route can be modified using one or more methods. For example, a route can be modified by increasing or decreasing the connections allowed on at least one of the destination endpoints 214, 216, and 218. If the number of connections allowed on destination endpoints 214 and 216 are decreased to zero while the number of connections allowed on destination endpoint 218 is maintained at a non-zero number (e.g. 100), destination endpoint 218 will be the preferred access point into provider network 280. Because the connections limits associated with destination endpoints 214 and 216 are zero, the routes through destination endpoints 214 and 216 are effectively blocked.

Rather than decreasing the connection-limit associated with a particular destination endpoint to a number such as zero, effectively blocking that destination endpoint, the destination endpoint can instead continue to be monitored by trickling connections through the destination endpoint. If a destination endpoint is totally blocked by decreasing the connection-limit to zero, an SBC-network controller typically cannot dynamically determine whether the delay associated with connections through a destination endpoint will subside over time or over a change of conditions because no connections are allowed. For example, instead of decreasing the connection-limit on destination endpoint 218 from a limit of 1000 to zero when an alarm condition is satisfied (e.g. an alarm condition associated with a delay threshold), the connection-limit on destination endpoint 218 can be decreased, for example, to five. The SDRs for the few connections established through destination endpoint 218 can be processed with reference to the alarm condition. If the delay associated with the connections improves below the alarm condition threshold, the connection-limit can be increased from five to a normal connection-limit. The connection-limit, however, does not necessarily have to be increased to the previous connection-limit of 1000, but rather in some embodiments to an intermediate value.

A route can also be modified by changing the priority of a route relative to other routes controlled by one or more SCs. For example, the route including destination endpoint 214 can be associated with a priority level that is higher than that of the routes including destination endpoints 216 and 218. By modifying the priority level for one or more routes, the number of connections through the destination endpoints 214, 216, and 218 will not be limited to specific connection-limits, but will instead be controlled by respective priority values.

In some embodiments, a route modification can be a combination of more than one modifications. For example, based on the satisfying of an alarm condition, both priority information and connection-limit information contained within routing information can be modified. Also, in some embodiments, an action in addition to a route change can be triggered when an alarm condition is changed from either satisfied to unsatisfied to vice versa. For example, a notification e-mail can be sent to a SoIP network manager notifying the network manager that a route change has taken place.

Figure 3:
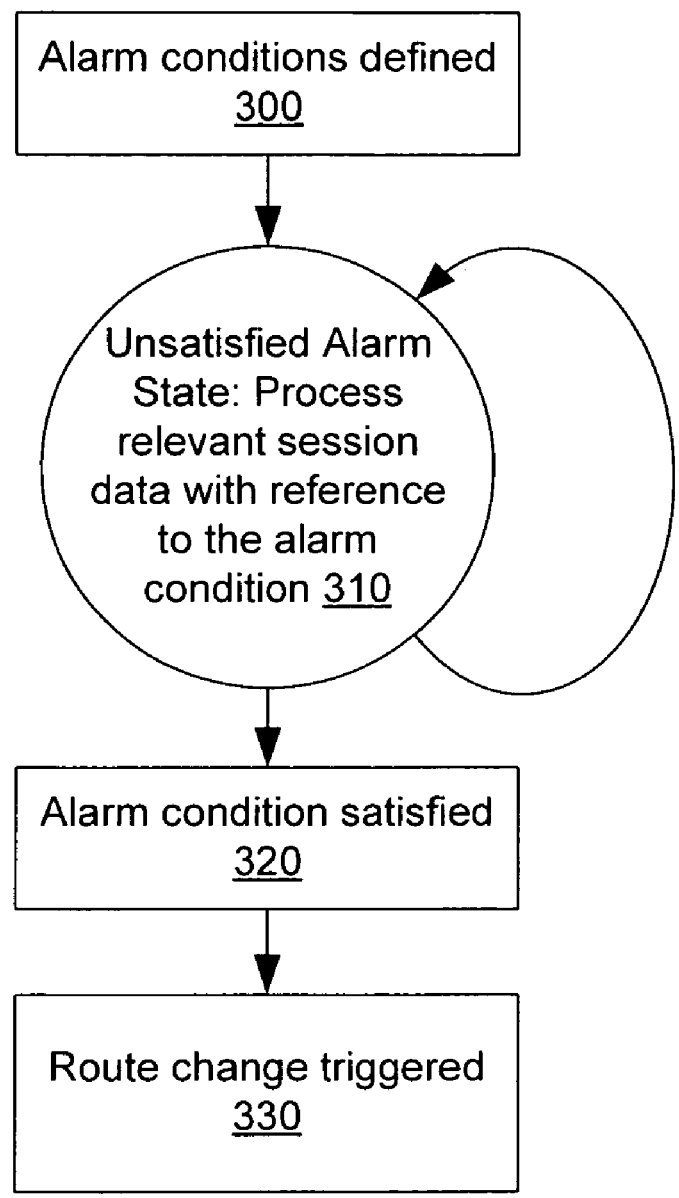
FIG. 3 is a flowchart that illustrates an alarm flow, according to an embodiment of the invention.

FIG. 3 is a flowchart that illustrates an alarm flow that can be used to trigger a routing change for a route in a SoIP network. The flowchart shows that one or more alarm conditions are first defined at 300. The alarm conditions can include any condition relating to the SoIP network. The state of an alarm condition is generally based on, but not necessarily limited to, session layer parameters and extrinsic parameters that are included in an SDR.

The alarm condition can be a single threshold limit associated with a session layer parameter such as a QoS parameter or can be a complex condition that incorporates more than one session layer parameter in any mathematical or logical combination with any type or number of threshold values or limits. For example, the alarm condition can be an alarm condition that incorporates a boolean condition that is only satisfied when a jitter parameter exceeds a specified threshold value and when a delay parameter exceeds a different specified threshold value.

In some embodiments, rather than being a boolean type alarm condition, the alarm condition can be defined such that the alarm condition is satisfied when the multiplication or addition of two QoS parameters is less than a certain value or even between specified limits. In some embodiments, the alarm condition can be based on the most recently received SDRs. Alternatively, the alarm condition can be defined such that the alarm condition is only satisfied when a certain volume of data, when averaged over time, exceeds a threshold value. This type of averaging of historical data as a moving average can also be termed a moving-window average.

The alarm conditions can also be defined in terms of extrinsic parameters such as time-of-day, day of the week, numbers of calls, or route cost parameters. A extrinsic-parameter values can be included in or associated with one or more SDRs. For example, an alarm condition can be configured such that a route is modified at a certain time of day and day of the week or modified based on a certain number of calls that are connected using the route. The extrinsic parameters can also be used, for example, in any alarm condition in combination with a QoS-based condition. For example, an alarm condition can be defined such that a QoS-based condition associated with a particular alarm condition is not considered for an SBC if the total number of SDRs or total number of connections processed by the SBC are above or below a threshold limit during a specified period of time. This kind of conditional limit within an alarm condition can be referred to as a system load filter.

Route cost parameters such as the cost of a connection can also be included in an SDR to allow for alarming and route modification based on cost. This information can be used in conjunction with an alarm condition that is configured to identify, for example, a least cost route or a maximum-profit route. If an alarm condition is defined so that the priority of several routes on one or more SCs are modified to maximize profits, the average cost of connections on various routes can be calculated with reference to the profit-maximizing alarm condition and routing adjustments can be made to maximize profits. Alternatively, if an alarm condition is defined so that the priority of several routes on one or more SCs are modified to minimize costs, the average cost of connections on various routes can be calculated with reference to the low-cost alarm condition and routing adjustments can be made to minimize costs. The route cost parameters can be included as relative values that are not tied to a specific currency.

In some alternative embodiments, the alarm conditions can be based on data that can be collected from partially loaded SDRs before a call has been terminated. For example, an alarm condition can trigger the termination of a connection through the adjustment of a route if a connection exceeds a specified time limit.

After the alarm conditions have been defined at 300, session data relevant to the alarm conditions is processed at 310. Information such as a specific value of a QoS parameter, if relevant to the alarm condition, can be extracted from at least one SDR generated by one or more SCs. Likewise, a value of an extrinsic parameter such as the time-of-day, if relevant to the alarm condition can be obtained. If the alarm condition is related to a combination of parameters in the SDR such as the extrinsic parameters and session layer parameters, values of the relevant parameters can be retrieved and processed to determine the state of the alarm condition.

The flowchart shows that the relevant data is repeatedly processed with reference to the alarm condition at 310, as indicated by the looping arrow, until the alarm condition is satisfied at 320. When the alarm condition is satisfied, the alarm-state changes from an unsatisfied alarm-state to a satisfied alarm-state. The frequency with which the data is processed and compared with the alarm condition in the unsatisfied alarm-state can be varied depending upon variables such as the volume of data being processed, the frequency in which data is received or updated, and the types of alarm conditions that are being monitored.

The alarm condition and the instructions for extracting relevant session data can be contained in an alarm thread that is executed by, for example, an alarm manager (e.g. alarm manager 208 in FIG. 2) that has access to the values for the appropriate SDR session data. The alarm thread can be programmed to run only when new data is obtained by the alarm manager or can be programmed to run at regular intervals. Alternatively, the alarm thread can be programmed to run only when a the alarm manager has the capacity to handle the execution of the thread.

An alarm thread, which can also be an alarm function, can be programmed to accommodate complex alarm conditions and can be programmed to filter and process data for those alarm conditions. For example, if the alarm condition is based on an average of a specified quantity of data or a specified interval of data, the alarm thread can process historical data to create moving averages or a moving-window average. The alarm thread can be programmed to remove statistically invalid points when processing the data and calculating averages that are compared with alarm conditions.

An alarm thread can be executed in parallel with multiple other alarm threads each of which contain alarm conditions that are separately monitored based on session layer parameters and extrinsic data. Because the alarm threads can contain alarm conditions and/or instructions for route changes that overlap, conflicts between alarm threads can be resolved by assigning priorities to the alarm conditions, alarm threads, and/or route changes. The alarm threads and their associated conditions can also be analyzed and combined based on their overlap. For example, a new alarm thread can be instantiated if alarm conditions within two or more alarm threads overlap in a manner such that a single alarm thread could equivalently cover the two or more alarm threads.

When the alarm condition is satisfied and the alarm-state changes from unsatisfied to satisfied a route change is triggered at 330. The route change can be triggered by an indicator that, for example, directly modifies a route or triggers the sending of detailed instructions that are received by an SC. The indicator itself can also contain detailed instructions that can be processed by an SC to modify routing information. The type of indictor and information contained in the indicator can be specified in an alarm condition or generated by an alarm thread programmed to specify the information contained in the indicator.

The flowchart shows that the alarm conditions are defined 300 before relevant data is processed and compared with the alarm condition 310, but the definition of an alarm condition and even the configuration of an alarm thread that executes the processing of data with reference to an alarm condition can be modified at any point in the flow. For example, if a first alarm condition in a first alarm thread is in conflict with a newly defined second alarm condition in a second alarm thread, the first alarm thread that may already be processing data can be modified based on the conflicting second alarm condition.

Figure 4:
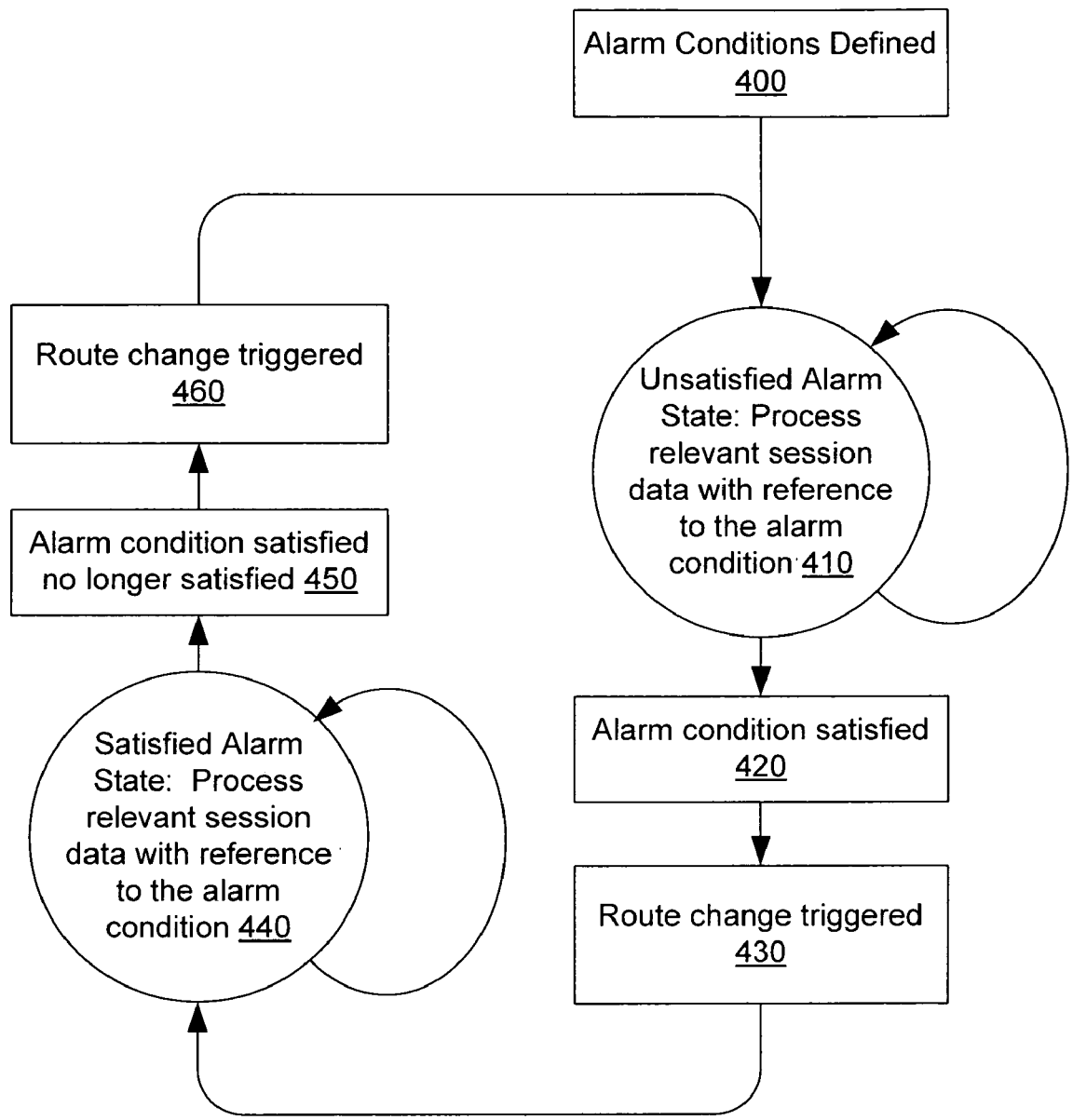
FIG. 4 is a flowchart that illustrates a full-cycle alarm flow, according to an embodiment of the invention.

FIG. 4 is a flowchart that, like FIG. 3, shows an alarm flow that can be used to trigger a routing change for a route in a SoIP network. However, FIG. 4 shows a full-cycle alarm loop. The alarm flow is a full-cycle alarm loop because the alarm-state changes from an unsatisfied alarm-state at 410 to a satisfied alarm-state at 440 at some point in time, and then back to an unsatisfied alarm-state at 410 at some later point in time. These changes are triggered when an alarm condition is first unsatisfied, then satisfied and once again unsatisfied. The figure shows that while in an unsatisfied alarm-state, data that is relevant to the alarm condition is processed with reference to the alarm condition at 410. The relevant data is repeatedly processed with reference to the alarm condition at 410, as indicated by the looping arrow, until the alarm condition is satisfied at 420. When the alarm condition is satisfied at 420, a route change is triggered at 430 and the alarm-state becomes satisfied at 440. In the satisfied alarm-state, data relevant to the alarm condition is processed with reference to the alarm condition at 440. The relevant data is repeatedly processed with reference to the alarm condition at 440, as indicated by the looping arrow, until the alarm condition is no longer satisfied at 450. When it is determined that the alarm condition is no longer satisfied at 450, a route change is triggered at 460 and the alarm-state becomes unsatisfied at 440.

Although the flowchart shows that the alarm conditions are defined at 400 before relevant data is processed with reference to the alarm condition at 410, the definition of an alarm condition and even the configuration of an alarm thread that executes the processing of data with reference to an alarm condition can be modified at any point in the flow. For example, the alarm condition can be defined initially in a satisfied alarm-state rather than in an unsatisfied alarm-state.

Figure 5:
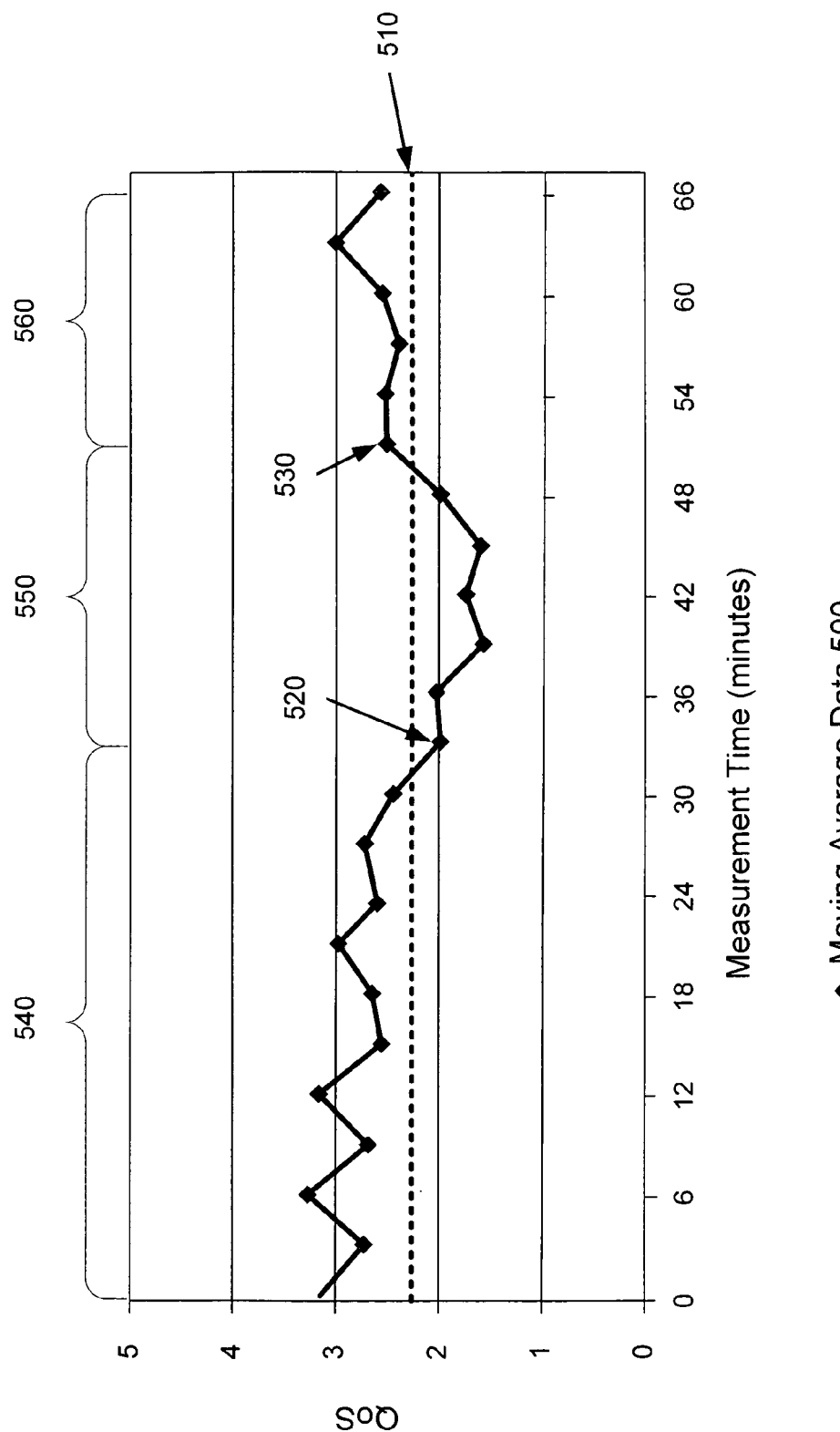
FIG. 5 shows graph of data relative to alarm condition, according to an embodiment of the invention.

FIG. 5 is a graph that shows moving-average data 500 for a QoS measurement relative to an alarm-condition threshold 510 threshold limit; in particular, this graph illustrates data as applied in a full-cycle alarm flow. The x-axis is measurement time in minutes and the y-axis is QoS in arbitrary units. An alarm thread is configured such that a routing change is triggered when the average of thirty minutes of QoS data, calculated every three minutes, falls below the alarm-condition threshold 510 of 2.25.

The graph shows that alarm-state starts in an unsatisfied alarm-state 540. During the unsatisfied alarm-state 540, QoS data is processed with reference to the alarm condition threshold 510. The alarm-state is in an unsatisfied alarm-state 540 until the moving-average data point 520 is calculated at the measurement time of thirty-three minutes. At this point, the alarm condition 510 is satisfied and the alarm-state changes from an unsatisfied alarm-state 540 to a satisfied alarm-state 550. While in the satisfied alarm-state 550, QoS data continues to be processed with reference to the alarm condition threshold 510 until the moving average data point 530 is calculated at measurement time fifty-one. At this point, the alarm condition 510 is no longer satisfied and the alarm-state changes from a satisfied alarm-state 550 to an unsatisfied alarm-state 560.

In some embodiments, a first route change that is triggered at point 520 when the alarm-state changes from an unsatisfied alarm-state 540 to a satisfied alarm-state 550 can be different than a second route change that is triggered at point 530 when the alarm-state changes from the satisfied alarm-state 550 to the unsatisfied alarm-state 560. Also, in an alternative embodiment, the first alarm condition that triggers a change from a satisfied alarm-state 540 to an unsatisfied alarm-state 550 can be different than a second alarm condition that triggers a change from the unsatisfied alarm-state 550 back to the satisfied alarm-state 560.

In conclusion, among other things, a method for modifying a route based on an alarm condition is described. While various embodiments of the invention have been described above, it should be understood that they have been presented by way of example only, and various changes in form and details may be made. For example, an alarm condition within an alarm thread can be defined such that an alarm flow includes a third alarm-state.

What is claimed is:

1. A method, comprising:
    at a session border controller (SBC):
        modifying a route for media of a media session when an alarm-state of an alarm condition is changed from unsatisfied to satisfied, the route being within a Session over Internet Protocol (SoIP) network and including at least a source endpoint, the session controller, an original intermediate destination endpoint selected from a plurality of intermediate destination endpoints, and a destination terminal adapter, an indicator of the alarm condition received from an alarm manager of an SBC network controller and based on session data about the media session stored within a session detail record (SDR);
        wherein modifying the route for media of a media session includes the SBC generating the SDR which contains the session data about the media session, the session data including session layer parameters and extrinsic parameters, wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, a quality of service parameter, and a ratings factor (r-factor),
        wherein the extrinsic parameters include at least one of a time-of-day indicator, a day-of-week indicator, a number-of-calls indicator, and a route cost indicator parameter,
        the SBC sending the SDR to the alarm manager of the SBC network controller, and
        the SBC selecting a different intermediate destination endpoint from the plurality of intermediate destination endpoints with which to route the media session, such that the modified route bypasses the original intermediate destination endpoint in reaching the destination terminal adapter.

2. The method of claim 1, wherein the alarm condition includes a first condition and a second condition, the alarm-state is changed from unsatisfied to satisfied based on the first condition within the alarm condition, the alarm-state is changed from satisfied to unsatisfied based on the second condition within the alarm condition.

3. The method of claim 1, wherein the modifying the route when the alarm-state is changed from unsatisfied to satisfied includes modifying route information for the route based on an indicator triggered in response to the alarm-state being changed from unsatisfied to satisfied, the route information being associated with at least one session controller.

4. The method of claim 1, wherein the modifying the route when the alarm-state is changed from satisfied to unsatisfied includes modifying route information for the route based on an indicator triggered in response to the alarm-state being changed from satisfied to unsatisfied, the route information being associated with at least one session controller.

5. The method of claim 1, wherein the modifying the route when the state of the alarm is changed from unsatisfied to satisfied includes modifying a priority associated with the route, the modifying the route when the state of the alarm is changed from satisfied to unsatisfied includes modifying the priority associated with the route.

6. The method of claim 1, wherein:
    the alarm-state changes from unsatisfied to satisfied when the alarm condition is satisfied based on the session data,
    the alarm-state changes from satisfied to unsatisfied when the alarm condition is unsatisfied based on the session data.

7. The method of claim 1, wherein the alarm condition is included in a first alarm thread from a plurality of alarm threads, the plurality of alarm threads being executed in parallel.

8. A method, comprising:
    at a session border controller (SBC):
        receiving an instruction associated with a definition of an alarm condition; and
        modifying a connection-limit associated with an endpoint when an alarm-state of the alarm condition is changed from at least one of unsatisfied to satisfied and satisfied to unsatisfied, the endpoint being within a Session over Internet Protocol (SoIP) network, an indicator of the alarm condition received from an alarm manager of an SBC network controller and based on session data about the media session stored within a session detail record (SDR);
        wherein modifying the connection-limit associated with the endpoint includes the SBC generating the SDR which contains the session data about the media session, the session data including session layer parameters and extrinsic parameters,
        wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, a quality of service parameter, and a ratings factor (r-factor),
        wherein the extrinsic parameters include at least one of a time-of-day indicator, a day-of-week indicator, a number-of-calls indicator, and a route cost indicator parameter,
        the SBC sending the SDR to the alarm manager of the SBC network controller, and
        the SBC modifying the connection-limit associated with the endpoint, the modified connection-limit being greater than zero.

9. The method of claim 8, wherein the modifying includes at least one of increasing the connection-limit on at least one session controller and decreasing the connection-limit on at least one session controller.

10. The method of claim 8, wherein the alarm condition includes a first condition and a second condition, the alarm-state is changed from unsatisfied to satisfied based on the first condition within the alarm condition, the alarm-state is changed from satisfied to unsatisfied based on the second condition within the alarm condition.

11. The method of claim 8, wherein the alarm condition is included in a first alarm thread from a plurality of alarm threads, the plurality of alarm threads being executed in parallel.

12. The method of claim 8, wherein:
the alarm-state changes from unsatisfied to satisfied when the alarm condition is satisfied based on the session data,
the alarm-state changes from satisfied to unsatisfied when the alarm condition is unsatisfied based on the session data.

13. A method, comprising:
at a session border controller (SBC):
receiving an instruction associated with a definition of an alarm condition; and
modifying a priority associated with at least one of a route and an endpoint when an alarm-state of an alarm condition is changed from at least one of unsatisfied to satisfied and satisfied to unsatisfied, the endpoint being within a Session over Internet Protocol (SoIP) network, an indicator of the alarm condition received from an alarm manager of an SBC network controller and based on session data about the media session stored within a session detail record (SDR);
wherein modifying the priority associated with the at least one of a route and an endpoint includes the SBC generating the SDR which contains the session data about the media session, the session data including session layer parameters and extrinsic parameters,
wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, a quality of service parameter, and a ratings factor (r-factor),
wherein the extrinsic parameters include at least one of a time-of-day indicator, a day-of-week indicator, a number-of-calls indicator, and a route cost indicator,
the SBC sending the SDR to the alarm manager of the SBC network controller, and
the SBC modifying the priority associated with the at least one of a route and an endpoint.

14. The method of claim 13, wherein the modifying includes modifying the priority of the at least one of the route and the endpoint on at least one session controller, the at least one session controller is associated with the at least one of the route and the endpoint.

15. The method of claim 13, wherein the alarm condition is included in a first alarm thread from a plurality of alarm threads, the plurality of alarm threads being executed in parallel.

16. A method comprising:
at a session border controller (SBC):
receiving an instruction associated with a definition of an alarm condition; and
modifying a configuration of the SBC when an alarm-state of an alarm condition is changed from at least one of unsatisfied to satisfied and satisfied to unsatisfied, the SBC being within a Session over Internet Protocol (SoIP) network, an indicator of the alarm condition received from an alarm manager of an SBC network controller and based on session data about the media session stored within a session detail record (SDR);
wherein modifying the configuration of the SBC includes the SBC generating the SDR which contains the session data about the media session, the session data including session layer parameters and extrinsic parameters,
wherein the session layer parameters include at least one of a call duration indicator, a start time indicator, an end time indicator, a source endpoint indicator, a destination endpoint indicator, a delay indicator, a media quality indicator, a packet loss indicator, a packet delay variance indicator, a quality of service parameter, and a ratings factor (r-factor),
wherein the extrinsic parameters include at least one of a time-of-day indicator, a day-of-week indicator, a number-of-calls indicator, and a route cost indicator,
the SBC sending the SDR to the alarm manager of the SBC network controller, and
the SBC modifying a set of connections, the set of connections being more than zero after the modifying.

17. The method of claim 16, wherein the modifying includes modifying a system resource of the session controller.

18. The method of claim 16, wherein the modifying includes modifying a route associated with the set of connections.

19. The method of claim 16, wherein the modifying includes modifying a property associated with an endpoint associated with the set of connections.

20. The method of claim 16, wherein the modifying includes modifying a priority associated with at least one of a route and an endpoint associated with the set of connections.

* * * * *